(12) United States Patent
Mizell et al.

(10) Patent No.: US 8,832,014 B2
(45) Date of Patent: Sep. 9, 2014

(54) FORWARD INFERENCING OF FACTS IN PARALLEL

(75) Inventors: David Mizell, Sammamish, WA (US);
Christopher D. Rickett, Bloomington, IN (US)

(73) Assignee: Cray Inc., Seattle, WA (US)

( * ) Notice: Subject to any disclaimer, the term of this patent is extended or adjusted under 35 U.S.C. 154(b) by 261 days.

(21) Appl. No.: 13/529,672

(22) Filed: Jun. 21, 2012

(65) Prior Publication Data
US 2013/0346354 A1 Dec. 26, 2013

(51) Int. Cl.
*G06N 5/02* (2006.01)
(52) U.S. Cl.
CPC . *G06N 5/025* (2013.01); *G06N 5/02* (2013.01)
USPC ............................................. 706/47; 706/45
(58) Field of Classification Search
None
See application file for complete search history.

(56) References Cited

U.S. PATENT DOCUMENTS 6,353,829 B1 3/2002 Koblenz et al.

OTHER PUBLICATIONS

Karim, et al., Connecting User Interfaces and User Impairments for Semantically Optimized Information Flow in Hospital Information Systems, Proceedings of I-MEDIA '07 and I-SEMANTICS '07, Graz, Austria, Sep. 5-7, 2007, pp. 372-379.*
Goodman, Eric L. et al., "High-performance Computing Applied to Semantic Databases", ESWC '11, Proceedings of the 8th Extended Semantic Web Conference on The Semanic Web: Research and Applications—vol. Part II, Springer-Verlag Berlin, Heidelberg, 2011, pp. 31-45.
Goodman, Eric L. et al. "Scalable In-memory RDFS Closure on Billions of Triples", The 6th International Workshop on Scalable Semantic Web Knowledge Base Systems, Nov. 2010, pp. 17-31.

* cited by examiner

*Primary Examiner* — Wilbert L Starks
(74) *Attorney, Agent, or Firm* — Perkins Cole LLP

(57) ABSTRACT

A method and system for inferring facts in parallel in a multiprocessor computing environment is provided. An inference system infers facts by applying rules to a collection of existing facts. For each existing fact, the inference system schedules a thread to apply the rules to that existing fact. As a thread infers a new fact (i.e., one that is not already in the collection of facts), the thread adds that inferred fact to the collection of facts. When a thread adds a new fact to the collection, the thread also applies the rules to that new fact. After the threads complete execution, the inference system may apply the rules to the facts of the collection, including the newly inferred facts, by again launching a thread for each fact to apply the rules to that fact. The inference system performs this processing iteratively until a termination condition is satisfied.

26 Claims, 10 Drawing Sheets

FORWARD INFERENCING OF FACTS IN PARALLEL

BACKGROUND

Semantic data models allow relationships between resources to be modeled as facts. The facts are often represented as triples that have a subject, a predicate, and an object. For example, one triple may have the subject of "John Smith," the predicate of "ISA," and the object of "physician," which may be represented as <John Smith, ISA, physician>.

This triple represents the fact that John Smith is a physician. Other triples may be <John Smith, graduate of, University of Washington>
representing the fact that John Smith graduated from the University of Washington and <John Smith, degree, MD>
representing the fact that John Smith has an MD degree. Semantic data models can be used to model the relationships between any type of resources such as web pages, people, companies, products, meetings, and so on. One semantic data model, referred to as the Resource Description Framework ("RDF"), has been developed by the World Wide Web Consortium ("W3C") to model web resources, but can be used to model any type of resource. The triples of a semantic data model may be stored in a semantic database.

Semantic data models may allow for additional facts to be inferred from the existing facts based on rules defining the inferences that may be made. For example, a rule may be that if a subject has an MD degree, then an inference can be made that the subject is a physician. This rule may be represented by an if-then-else statement as follows:

if (<?subject, degree, MD>) then <?subject, ISA, physician>.

The <?subject, degree, MD> is a condition that specifies the existing triples with a predicate of degree and an object of MD. The <?subject, ISA, physician> is the inference that can be made when an existing triple matches the condition of the rule. The "?" in "?subject" indicates that "?subject" is a variable to be given the value from the matching triple. If this rule is applied to the example triples described above, then because the fact <John Smith, degree, MD> matches the condition of the rule, the fact <John Smith, ISA, physician> can be inferred.

The rules for inferring facts need not be limited to a single condition or a single inference as in this example rule, but can have multiple conditions and multiple inferences. The following is an example of a rule with multiple conditions and multiple inferences:

| if ( | <?subject, degree, MD> |
| | <?subject, licensed in, ?object> |
| | <?object, state of, USA>) |
| then | |
| | <?subject, ISA, physician> |
| | <?subject, member of, AMA> |
| | <?object, licenses, physicians>. |

This multiple condition rule is satisfied when an existing fact matches each condition. In this example, the conditions are satisfied when a first triple has a predicate of degree and object of MD, when the subject of that triple is also in a second triple as a subject with a predicate of licensed in, and the object of the second triple is in a third triple as a subject with a predicate of state of and an object of USA. If the existing facts include:

<John Smith, degree, MD>
<John Smith, licensed in, Washington>
<Washington, state of, USA>
<John Smith, licensed in, Oregon>
<Oregon, state of, USA> then the following facts can be inferred from this rule:

<John Smith, ISA, physician>
<John Smith, member of, AMA>
<Washington, licenses, physicians>
<Oregon, licenses, physicians>.

Since John Smith is licensed in two different states, two different sets of three triples match the conditions of the rule. The process of applying rules to existing triples is a transitive process because when an inferred fact is added to the collection additional facts may be inferred. The W3C has defined an RDF schema ("RDFS") that can be used to define the rules for inferring facts. Examples of rules defined using RDFS are described in a paper by Goodman and Mizell (Goodman, E. and Mizell, D., "Scalable In-memory RDFS Closure on Billions of Triples," The 6th International Workshop on Scalable Semantic Web Knowledge Base Systems, November 2010, p. 17-31), which is hereby incorporated by reference.

Current collections of triples can contain billions of triples. Because of the large size of the collections, the inferring of facts by applying rules to the triples can be computationally expensive and very time-consuming. Some attempts have been made to infer facts with a multiprocessor computer system such as the Cray XMT. The Cray XMT has a memory system that can be shared by hundreds and even thousands of multi-threaded processors. Each multi-threaded processor provides hardware support for 128 threads of execution. Aspects of the Cray XMT are described in the Goodman and Mizell paper and in U.S. Pat. No. 6,353,829, entitled "Method and System for Memory Allocation in a Multiprocessing Environment," which is hereby incorporated by reference.

DETAILED DESCRIPTION

Figure 1:
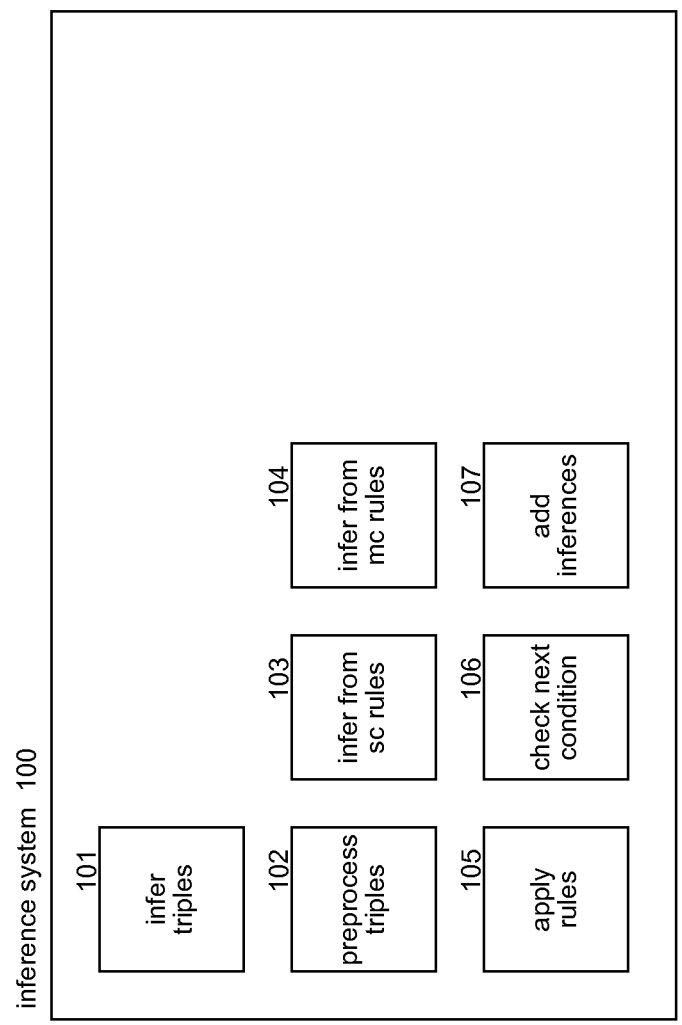
FIG. 1 is a block diagram illustrating components of the inference system in some embodiments.

A method and system for inferring facts in parallel in a multiprocessor computing environment is provided. In some embodiments, an inference system infers facts by applying rules to a collection of existing facts. For each existing fact, the inference system schedules a thread to apply the rules to that existing fact. For example, if the collection has 1 billion facts, the inference system schedules 1 billion threads, each of which applies the rules to one of the existing facts. The inference system assigns the threads to processors for execution. For example, if the computing environment has 1,000 processors, then the inference engine would assign on average 1 million threads to each processor. The inference system stores the existing facts in shared memory accessible by each processor. As a thread infers a new fact (i.e., one that is not already in the collection of facts), the thread adds that inferred fact to the collection of facts. The inference system may use a locking mechanism of the underlying processor architecture to control access to the collection when adding a new fact to the collection. When a thread adds a new fact to the collection, the thread also applies the rules to that new fact. After the threads complete execution, the inference system may apply the rules to the facts of the collection, including the newly inferred facts, by again launching a thread for each fact to apply the rules to that fact. The inference system performs this processing iteratively until a termination condition is satisfied, such as no new facts being inferred during an iteration.

In some embodiments, the inference system first applies the single condition rules to the facts and then iteratively applies the multiple condition rules to the facts. To apply the single condition rules, the inference system launches a thread for each existing fact to apply the single condition rules to that fact. Because the single condition rules do not require accessing the collection to retrieve additional facts, the thread applying the single condition rules can do so relatively quickly. When a thread infers a new fact, that thread may recursively invoke a function to apply the single condition rules to the new fact. Because a thread can determine whether a single condition rule is satisfied based only on the fact for which the thread was launched, the inference system need apply the single condition rules to each fact only once to infer all the possible facts based on those single condition rules. Moreover, because the inference system recursively applies the single condition rules as new facts are inferred, the inference system does not need to iteratively apply the single condition rules.

In some embodiments, after the inference system applies the single condition rules, the inference system iteratively applies the multiple condition rules to the existing facts that include the new facts inferred by applying the single condition rules. During each iteration, the inference system launches a thread for each existing fact to apply the multiple condition rules to that fact. When a thread infers a new fact from a multiple condition rule, the thread adds that new fact to the collection of facts and applies the single condition rules to the new fact. When the new fact satisfies a single condition rule, the thread adds any additional new facts to the collection and recursively applies the single condition rule to the additional new facts. After the threads complete their execution, the inference system determines whether a termination condition is satisfied. If the termination condition is not satisfied, the inference system performs the next iteration of applying the multiple condition rules to all the existing facts. If the termination condition is satisfied, the inference system stops. The termination condition may be satisfied when the last iteration did not infer any new facts or may be based on a fixed number of iterations.

In some embodiments, the inference system may preprocess the facts of a fact table to remove duplicates and to represent them in a form that is more efficient for processing. In the following, the facts are assumed to be represented as triples that include a subject, a predicate, and an object. In some embodiment, the fact table may already be in a form for more efficient processing. For example, the fact table may represent elements (i.e., subject, predicate, and object) of a triple by a unique identifier (e.g., integer), rather than by the character string (e.g., "John Smith" or "licensed in") of the element itself. The fact table may have a corresponding dictionary table (e.g., updated as facts with new elements are added to the fact table) that provides a mapping between the character string of each element and its unique identifier. Each entry for a fact in the fact table thus contains the unique identifier of the subject of the fact, the unique identifier of the predicate of the fact, and the unique identifier of the object of the fact. Alternatively, the inference system may input facts represented as character strings and, as a preprocessing step, generate the dictionary table and the fact table with elements represented by their unique identifiers. After preprocessing is complete, the fact table contains an entry for each unique triple and no duplicate triples. When the inference system infers a new triple (i.e., one not already in the fact table), the inference system adds the new triple to the fact table. The inference system may also check the validity of each fact and discard invalid facts. A fact may be invalid if it does not comply with the syntax of the semantic data model being used to represent the facts.

In some embodiments, the inference system uses indexes into the fact table to speed up the accessing of facts when applying the multiple condition rules to the facts of the fact table. Prior to the first iteration of applying the multiple condition rules to the facts, the inference system generates indexes. Prior to each subsequent iteration, the inference system regenerates or updates the indexes to account for new facts added to the fact table in the prior iteration. The inference system may generate a subject index, a predicate index, and an object index. The subject index maps each unique element identifier to the entries for the triples that contain that unique element identifier as a subject. The predicate index maps each unique element identifier to the entries for the triples that contain that unique element identifier as a predicate. The object index maps each unique element identifier to the entries for the triples that contain that unique element identifier as an object.

FIG. 1 is a block diagram illustrating components of the inference system in some embodiments. The inference system may be implemented as a program that executes in a multiprocessor system with a runtime that launches a thread for each iteration of a loop and assigns the threads to the processors for execution in parallel. The inference system 100 may include an infer triples component 101, a preprocess triples component 102, an infer from single condition rules component 103, an infer from multiple condition rules component 104, an apply rules component 105, a check next condition component 106, and an add inferences component 107. The infer triples component controls the overall processing of the inference system. The infer triples component invokes the preprocess triples component to populate the fact table with the existing facts. The infer triples component then invokes the infer from single condition rules component for each fact in the fact table. The underlying runtime launches a thread for each fact in the fact table. At the completion of the threads that apply the single condition rules, the infer triples component iteratively invokes the infer from multiple condition rules component for each fact in the fact table. As explained below in more detail, the infer from single condition rules component and the infer from multiple condition rules component invoke the apply rules component to apply the single condition rules or the multiple condition rules to a fact. The apply rules component invokes the check next condition for each rule to process the next condition in a multiple condition rule. The check next condition component retrieves triples from the fact table that match the next condition. The check next condition component recursively invokes itself for each retrieved fact. The check next condition component also invokes the add inferences component to add any inferred facts that are new facts to the fact table. The add inferences component adds a triple to the fact table for each newly inferred fact and applies the single condition rules to each newly inferred fact to infer additional facts.

Figure 2:
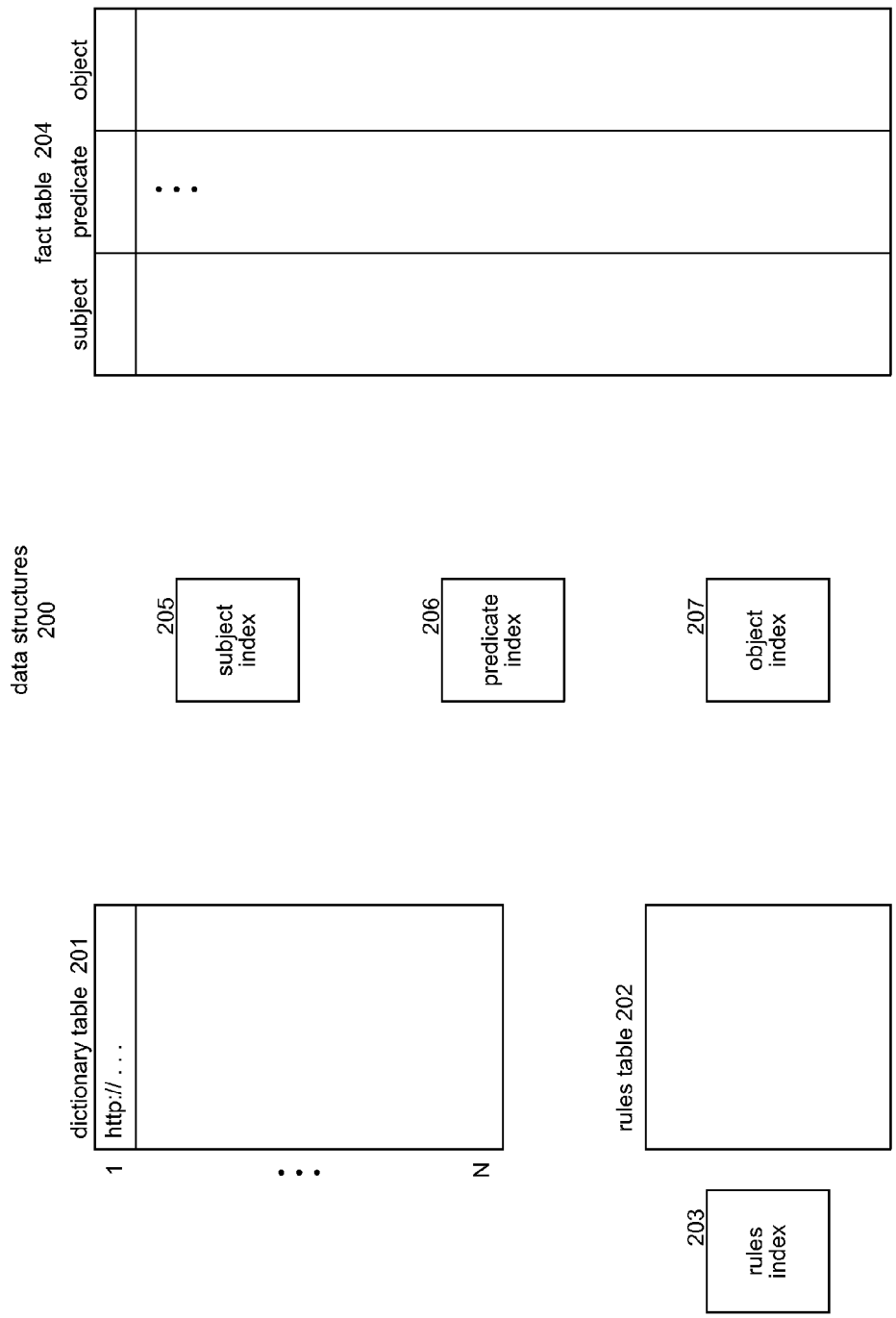
FIG. 2 is a block diagram that illustrates the data structures of the inference system in some embodiments.

FIG. 2 is a block diagram that illustrates the data structures of the inference system in some embodiments. The data structures 200 include a dictionary table 201, a rules table 202, a rules index 203, a fact table 204, a subject index 205, a predicate index 206, and an object index 207. The dictionary table contains an entry for each unique element of a fact in the fact table. The rules table contains an entry for each rule. The rules in the rule table may be sorted based on the number of conditions in the rules. The rules index maps predicates to the rules that contain that predicate in their first condition. For example, the entry in the rules index for the ISA predicate will identify each rule in the rules table that contains the ISA predicate in its first condition. The rules index will also contain an entry for predicates of rules that are variable to identify rules with a variable predicate. The rules index allows the inference system to quickly eliminate rules with predicates that a triple could not possibly match. The fact table contains an entry for each unique fact. Each entry for a fact contains the unique element identifiers of the subject, the predicate, and the object of the fact. The subject, predicate, and object indexes are generated by the inference system to speed up the retrieval of the triples when applying the multiple condition rules. One skilled in the art will appreciate that variety of different data structure organizational techniques may be used for organizing the data in these data structures. For example, the tables and indexes may be implemented using a tree structure organization, a hash table organization, a heap data structure, and so on.

Figure 3:
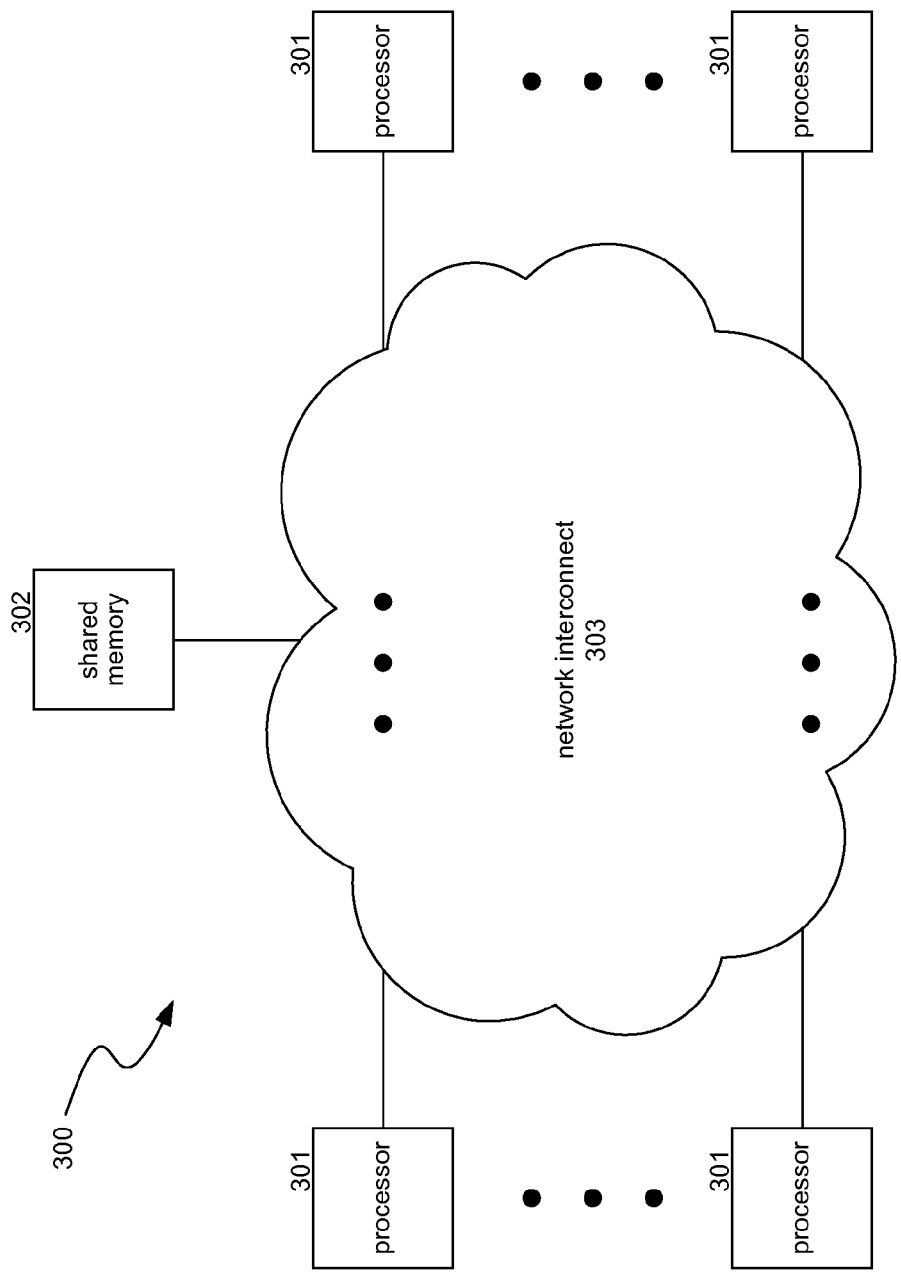
FIG. 3 is a block diagram illustrating components of a multiprocessor system upon which the inference system executes in some embodiments.

FIG. 3 is a block diagram illustrating components of a multiprocessor system upon which the inference system executes in some embodiments. The multiprocessor system 300 includes processors 301 and shared memory 302 that are interconnected via a network interconnect 303. The inference system stores the data structures in the shared memory that is accessible by each of the processors. Each processor executes the threads of the inference system in parallel by accessing the data structures in the shared memory. The multiprocessor system may be the Cray XMT or other multiprocessor system.

The processor on which the inference system may be implemented may include a central processing unit and local memory and may include input devices (e.g., keyboard and pointing devices), output devices (e.g., display devices), and storage devices (e.g., disk drives). The processors may access computer-readable media that includes computer-readable storage media and data transmission media. The computer-readable storage media includes memory and other storage devices that may have recorded upon or may be encoded with computer-executable instructions or logic that implements the inference system. The data transmission media is media for transmitting data using signals or carrier waves (e.g., electromagnetism) via a wire or wireless connection. Various functions of the inference system may also be implemented on devices using discrete logic or logic embedded as an application-specific integrated circuit. The devices on which the inference system is implemented are computing devices.

The inference system may be described in the general context of computer-executable instructions, such as program modules, executed by one or more computers, processors, or other devices. Generally, program modules include routines, programs, objects, components, data structures, and so on that perform particular tasks or implement particular data types. Typically, the functionality of the program modules may be combined or distributed as desired in various embodiments.

Figure 4:
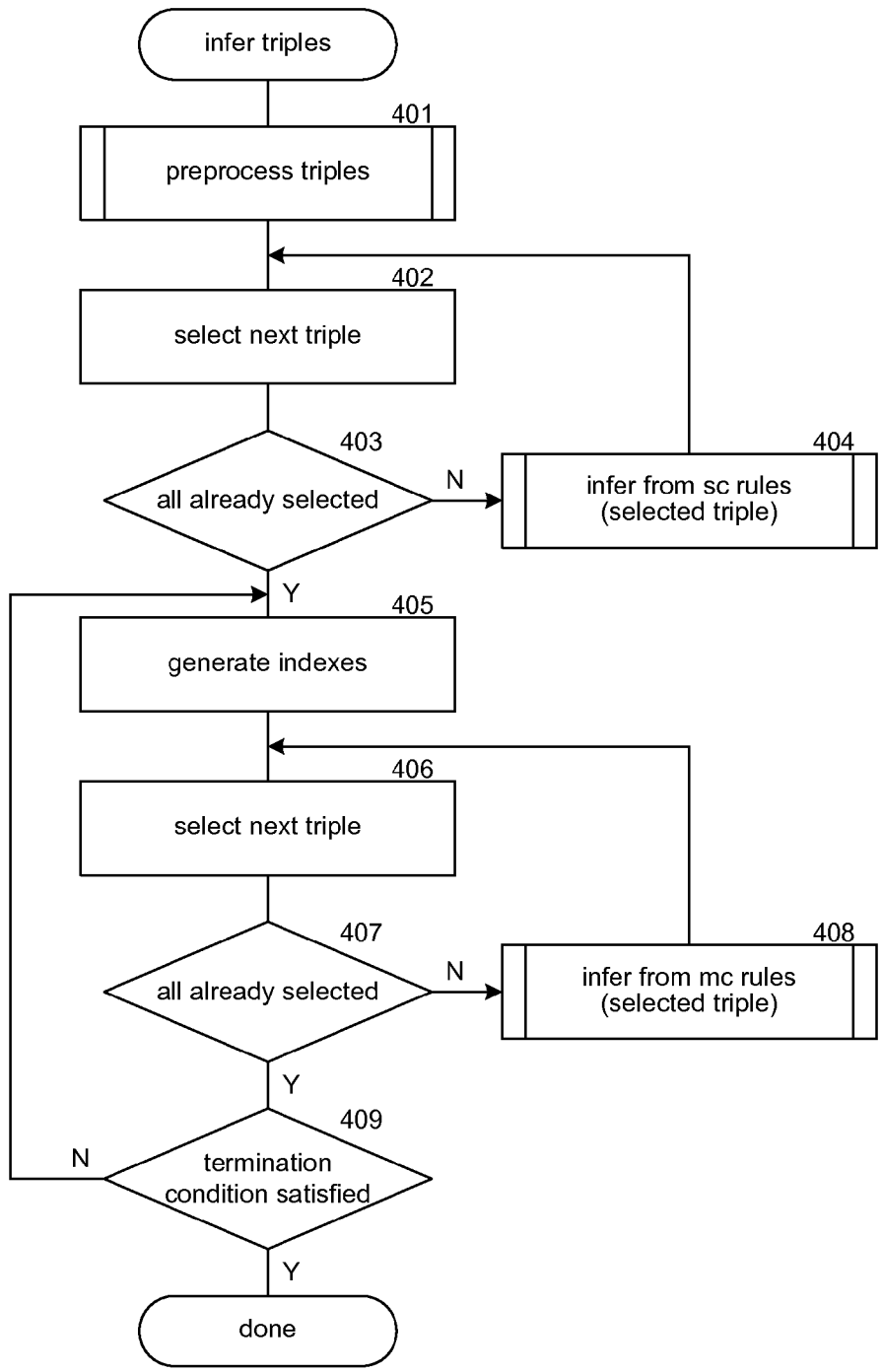
FIG. 4 is a flow diagram that illustrates the processing of the infer triples component of the inference system in some embodiments.

FIG. 4 is a flow diagram that illustrates the processing of the infer triples component of the inference system in some embodiments. The component is provided triples and rules and applies the rules to the triples to infer new triples. In block 401, the component invokes the preprocess triples component to generate the fact table from the triples. In some embodiments, the fact table may already be preprocessed and populated with unique triples when the infer triples component is invoked. In blocks 402-404, the component loops applying the single condition rules to each triple in the fact table. In block 402, the component selects the next triple in the fact table. In decision block 403, if all the triples of the fact table have already been selected, then the component waits for all launched threads to complete and then continues at block 405, else the component continues at block 404. In block 404, the component invokes the infer from single condition rules component passing the selected triple. The underlying runtime launches a thread to perform the processing of each invocation of the infer from single condition rules component for the selected triple. The component then loops to block 402 to select the next triple. In blocks 405-409, the component iteratively applies the multiple condition rules to the triples of the fact table. In block 405, the component generates the subject, predicate, and object indexes into the fact table. In blocks 406-409, the component performs one iteration by applying the multiple condition rules to each triple. In block 406, the component selects the next triple in the fact table. In decision block 407, if all the triples in the fact table have already been selected, then the component waits for the launched threads to complete and continues at block 409, else the component continues at block 408. In block 408, the component invokes the infer from multiple condition rules component passing the selected triple. The runtime generates a thread to perform the processing of each invocation of the infer from multiple condition rules component for the selected triple. The component then loops to block 406 to select the next triple. In decision block 409, if the termination condition is satisfied, then the component completes, else the component loops to block 405 to perform the next iteration of applying the multiple condition rules to the facts in the fact table.

Figure 5:
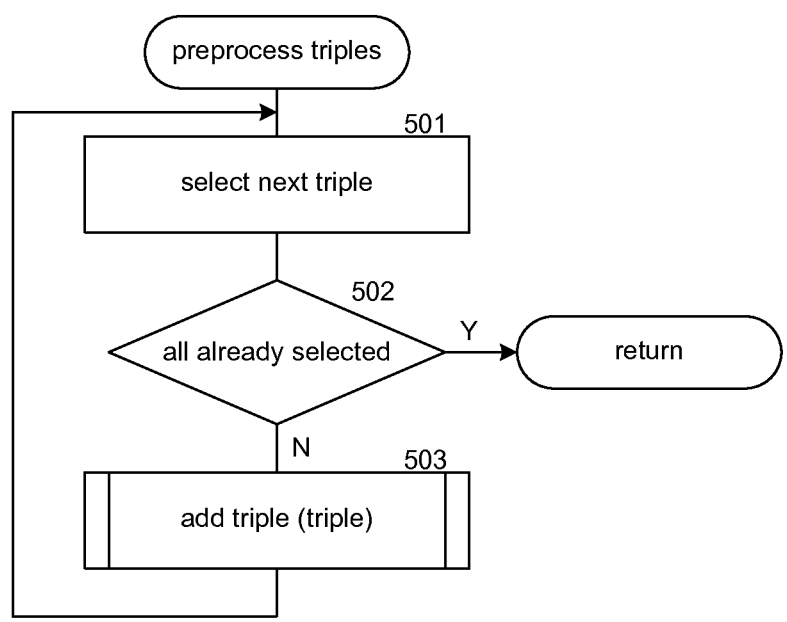
FIG. 5 is a flow diagram that illustrates the processing of the preprocess triples component of the inference system in some embodiments.

FIG. 5 is a flow diagram that illustrates the processing of the preprocess triples component of the inference system in some embodiments. The component loops selecting each triple and adds new triples to the fact table. In block 501, the component selects the next triple. In decision block 502, if all the triples have already been selected, then the component returns, else the component continues at block 503. In block 503, the component invokes the add triple component to add the selected triple to the fact table if it is not already in the fact table and then loops to block 501 to select the next triple. The runtime may launch multiple threads with an assigned group of triples to have the triples processed in parallel by the different processors.

Figure 6:
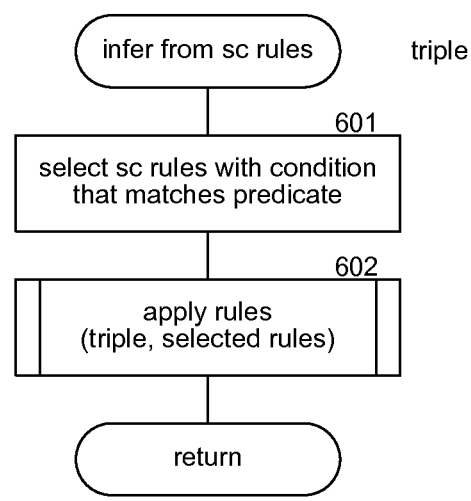
FIG. 6 is a flow diagram that illustrates the processing of the infer from single condition rules component of the inference system in some embodiments.

FIG. 6 is a flow diagram that illustrates the processing of the infer from single condition rules component of the inference system in some embodiments. The component is passed a triple and applies the single condition rules to that triple. In block 601, the component selects the single condition rules that may match the predicate using the index into the rules table. The single condition rules that may match include the rules with a predicate in their condition that is the same as the predicate of the triple and the rules with a variable predicate in their condition. In block 602, the component invokes the apply rules component passing the selected triple and the selected rules to apply the selected rules to the selected triple. The component then returns.

Figure 7:
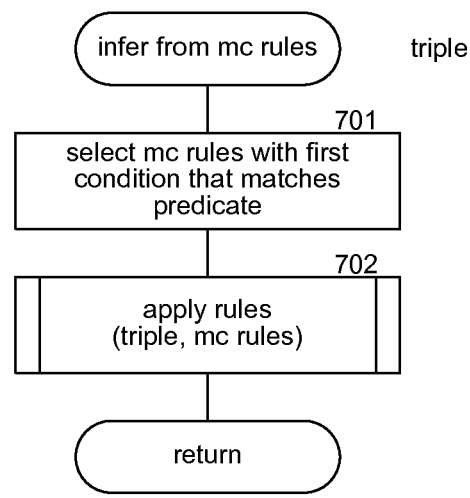
FIG. 7 is a flow diagram that illustrates the processing of the infer from multiple condition rules component of the inference system in some embodiments.

FIG. 7 is a flow diagram that illustrates the processing of the infer from multiple condition rules component of the inference system in some embodiments. The component is passed a triple and applies the multiple condition rules to that triple. In block 701, the component selects the multiple condition rules that may match the predicate using the index into the rules table. The multiple condition rules that may match include the rules with a predicate in their first condition that is the same as the predicate of the triple and the rules with a variable predicate in their first condition. Alternatively, the component might not use the rules index when processing multiple condition rules. In block 702, the component invokes the apply rules component passing the triple and the indication of the selected multiple condition rules. The component then returns.

Figure 8:
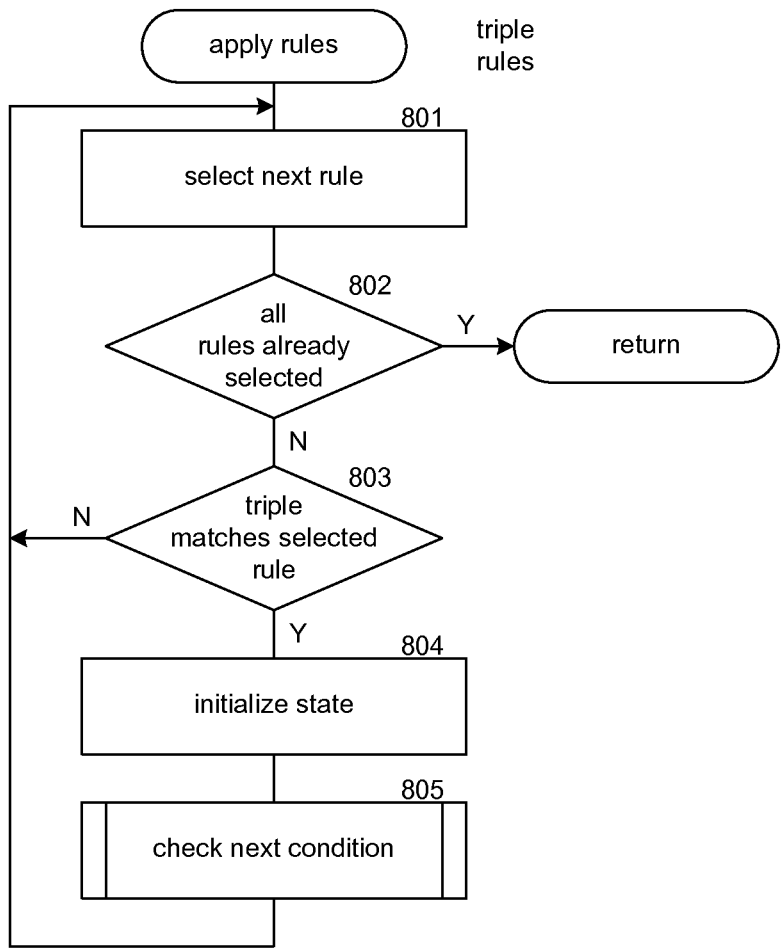
FIG. 8 is a flow diagram that illustrates the processing of the apply rules component of the inference system in some embodiments.

FIG. 8 is a flow diagram that illustrates the processing of the apply rules component of the inference system in some embodiments. The apply rules component is passed a triple and an indication of the rules to be applied. The component loops applying each rule to the triple. In block 801, the component selects the next rule. In decision block 802, if all the rules have already been selected, then the component returns, else the component continues at block 803. In decision block 803, if the triple matches the first condition of the selected rule, then the component continues at block 804, else the component loops to block 801 to select the next rule. In block 804, the component initializes the state of any variables, an indication that the selected rule is being processed, and an indication that the first condition of the selected rule has been processed. In block 805, the component invokes the check next condition component to check the next condition of the rule. The component then loops to block 801 to select the next rule.

Figure 9:
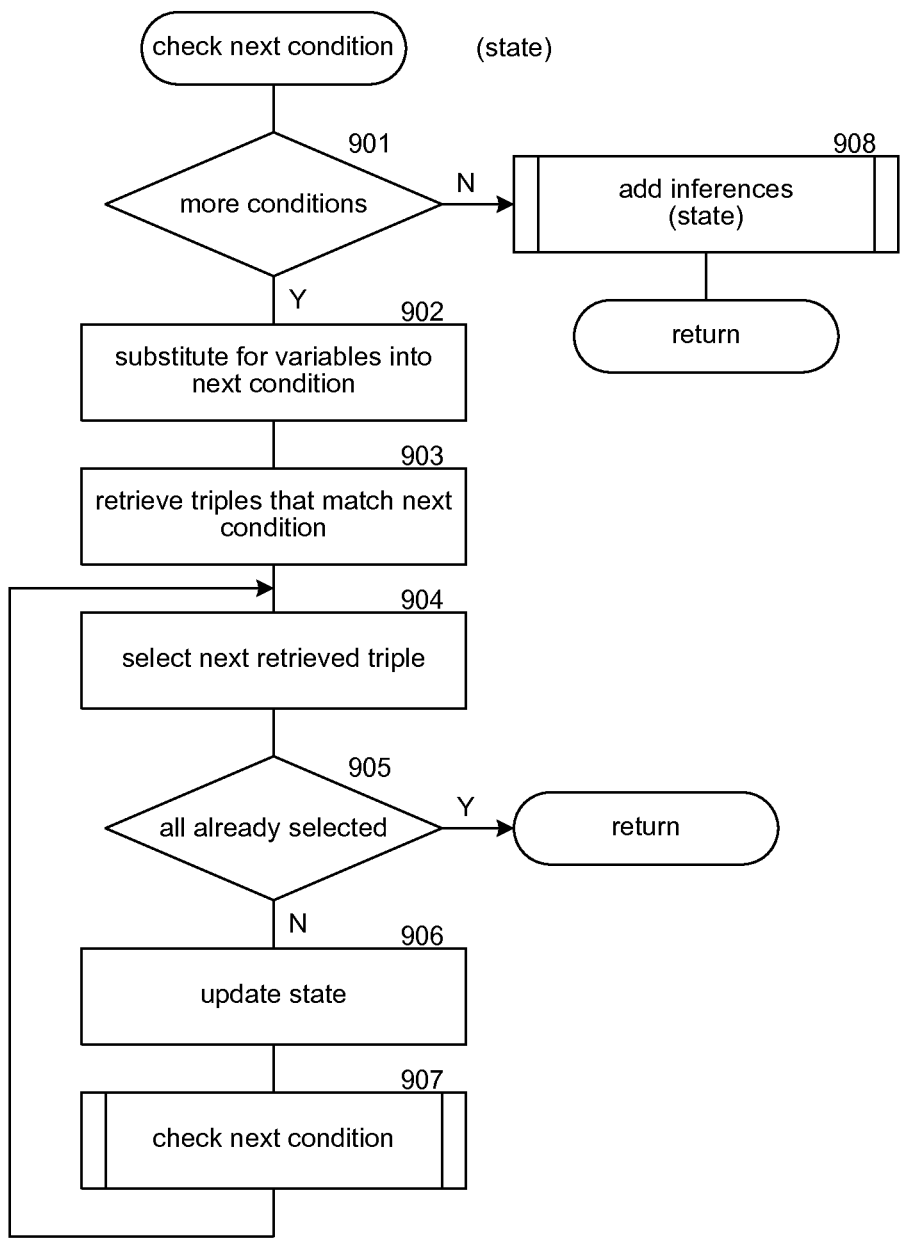
FIG. 9 is a flow diagram that illustrates the processing of the check next condition component of the inference system in some embodiments.

FIG. 9 is a flow diagram that illustrates the processing of the check next condition component of the inference system in some embodiments. The component is passed the current state for checking the selected rule. If there are no more conditions in the rule, then the rule is satisfied and the component adds the inferred triples to the fact table. If there are more conditions in the rule, then the component identifies the triples that match the next condition and loops recursively invoking the check next condition component for each of the identified triples. In decision block 901, if there are more conditions in the rule, then the component continues at block 902, else the component continues at block 908. In block 902, the component substitutes for any variables in the next condition. In block 903, the component retrieves triples from the fact table that match the next condition. In blocks 904-907, the component loops, invoking the check next condition component recursively for each of the retrieved triples. In block 904, the component selects the next retrieved triple. In decision block 905, if all the retrieved triples have already been selected, then the component returns, else the component continues at block 906. In block 906, the component updates the state information based on the selected triple. In block 907, the component recursively invokes the check next condition component passing the updated state information. The component then loops to block 904 to select the next retrieved triple. In block 908, since all the conditions have been processed, the fact table contains facts that match all the conditions of the rule. The component invokes the add inferences component passing the state (indicating values for variables based on the matching facts) to add the facts that are inferred from the rule indicated in the state. The component then returns.

Figure 10:
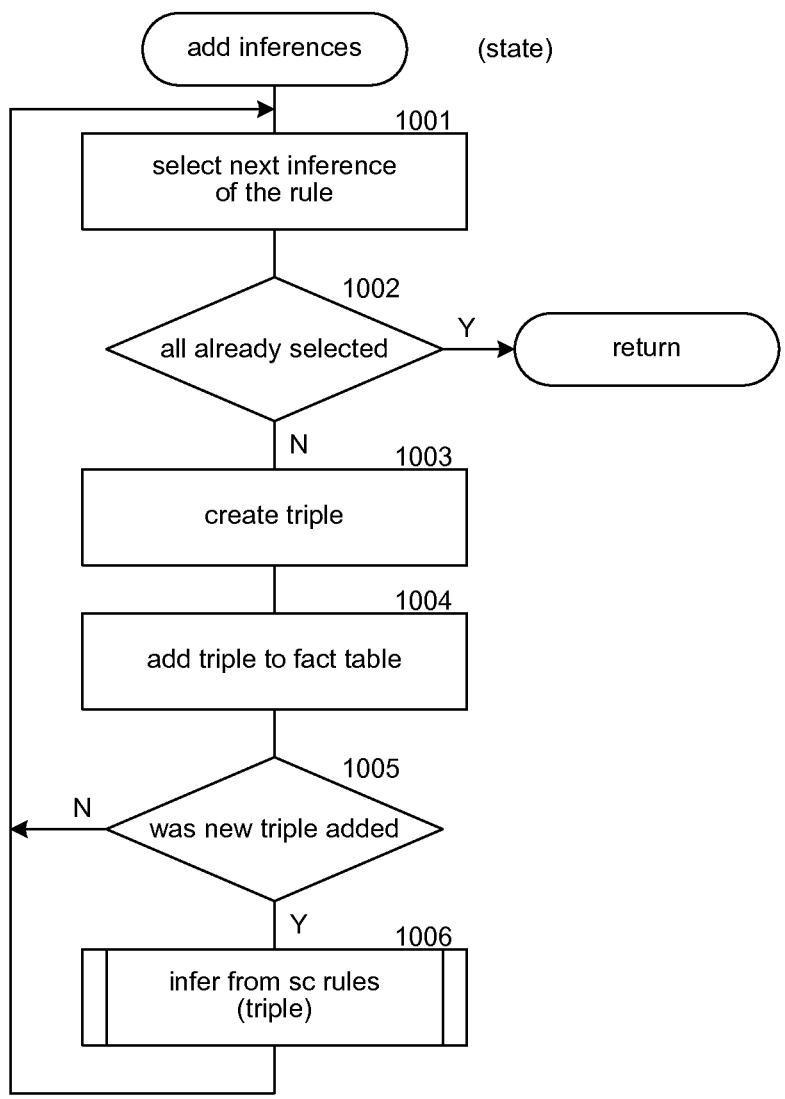
FIG. 10 is a flow diagram that illustrates the processing of the add inferences component of the inference system in some embodiments.

FIG. 10 is a flow diagram that illustrates the processing of the add inferences component of the inference system in some embodiments. The component is passed an indication of the state and loops adding a triple for each inference of the rule indicated in the state to the fact table. In block 1001, the component selects the next inference of the rule. In decision block 1002, if all the inferences of the rule have already been selected, then the component returns, else the component continues at block 1003. In block 1003, the component creates a triple by substituting the variables of the state into the selected inferred fact of the rule. In block 1004, the component adds the created triple to the fact table if it is not already in the fact table. In decision block 1005, if the created triple was added to the fact table, then the component continues at block 1006, else the component loops to block 1001 to select the next inference of the rule. In block 1006, the component invokes the infer from single condition rules component passing the created triple to infer new facts from the created triple by applying the single condition rules. This invocation of the infer from single condition rules component is a recursive invocation except when first invoked for a new triple inferred as a result of applying a multiple condition rule.

Although the subject matter has been described in language specific to structural features and/or acts, it is to be understood that the subject matter defined in the appended claims is not necessarily limited to the specific features or acts described above. Rather, the specific features and acts described above are disclosed as example forms of implementing the claims. Accordingly, the invention is not limited except as by the appended claims.

We claim:

1. A method in a computing system for inferring triples from rules, the method comprising:
providing a collection of triples;
providing rules for inferring triples, the rules including single condition rules and multiple condition rules;
for each triple in the collection, scheduling a thread to infer triples based on that triple by applying the single condition rules to that triple, adding any inferred triples not already in the collection to the collection, and applying the single condition rules to each inferred triple that is added to the collection; and
after completion of the threads that apply the single condition rules, performing iterations of the following until a termination condition is satisfied:
for each triple in the collection, scheduling a thread to infer triples by applying the multiple condition rules to that triple, adding any inferred triples not already in the collection to the collection, and applying the single condition rules to each inferred triple that is added to the collection.

2. The method of claim 1 wherein when an inferred triple is added to the collection as a result of applying the single condition rules, recursively applying the single condition rules to the added triple.

3. The method of claim 1 wherein the termination condition is satisfied when the applying of the multiple condition rules to each triple does not result in an inferred triple being added to the collection.

4. The method of claim 1 wherein the triples have a subject, a predicate, and an object.

5. The method of claim 4 including, prior to each iteration, generating a subject index, a predicate index, and an object index for the collection for identifying triples in the collection that contain a certain subject, a certain predicate, or a certain object.

6. The method of claim 1 wherein the applying of the single condition rules to an inferred triple is performed by the thread that inferred that inferred triple.

7. The method of claim 1 wherein a rule contains a condition and multiple inferences.

8. The method of claim 1 including preprocessing the triples of the collection to remove duplicate triples.

9. The method of claim 1 including preprocessing the triples of the collection to remove triples that are not valid triples.

10. A computer-readable storage medium containing computer-executable instructions for controlling processors in a multiprocessor system to infer facts from a collection of facts based on rules, by a method comprising:
for each fact in the collection, scheduling a thread to infer facts based on that fact by:
applying the rules to that fact,
adding any inferred facts not already in the collection to the collection, and
recursively applying the rules to each inferred fact that is added to the collection,
wherein scheduled threads are executed in parallel.

11. The computer-readable storage medium of claim 10 wherein the rules include single condition rules and multiple condition rules and wherein the single condition rules are applied to each fact before the multiple condition rules are applied to the facts.

12. The computer-readable storage medium of claim 11 wherein the multiple condition rules are applied iteratively to all the facts until a termination condition is satisfied.

13. The computer-readable storage medium of claim 12 wherein the termination condition is satisfied when an iteration does not result in an inferred fact being added to the collection.

14. The computer-readable storage medium of claim 11 wherein the facts have a subject, a predicate, and an object.

15. The computer-readable storage medium of claim 14 including, prior to each iteration, generating a subject index, a predicate index, and an object index for the collection for identifying facts in the collection that contain a certain subject, a certain predicate, or a certain object.

16. The computer-readable storage medium of claim 11 wherein the recursive application of the rules to an inferred fact applies only single condition rules.

17. The computer-readable storage medium of claim 11 wherein the recursive application of the rules to an inferred fact is performed by the thread that inferred that inferred fact.

18. The computer-readable storage medium of claim 10 wherein a rule contains a condition and multiple inferences.

19. The computer-readable storage medium of claim 10 including preprocessing the facts of the collection to remove duplicate facts.

20. The computer-readable storage medium of claim 10 including preprocessing the facts of the collection to remove facts that are not valid.

21. A computer-readable storage medium containing computer-executable instructions for controlling processors in a multiprocessor system to infer facts from a collection of facts based on rules that include single condition rules and multiple condition rules, by a method comprising:
for each fact in the collection, scheduling a thread to infer facts based on that fact by applying the single condition rules to that fact, adding any inferred facts not already in the collection to the collection, and recursively applying within that scheduled thread the single condition rules to each inferred fact that is added to the collection by that thread;
executing the scheduled threads on processors so that the threads are executed in parallel; and
after execution of the threads that apply the single condition rules, performing iterations of the following until a termination condition is satisfied:
for each fact in the collection, scheduling a thread to infer facts by applying the multiple condition rules to that fact, adding any inferred facts not already in the collection to the collection, and recursively applying within that scheduled thread the single condition rules to each inferred fact that is added to the collection by that thread; and
executing the scheduled threads on processors so that the threads are executed in parallel.

22. The computer-readable storage medium of claim 21 wherein the termination condition is satisfied when the applying of the multiple condition rules to each fact does not result in an inferred fact being added to the collection.

23. The computer-readable storage medium of claim 21 wherein the facts have a subject, a predicate, and an object.

24. The computer-readable storage medium of claim 21 wherein a rule contains a condition and multiple inferences.

25. The computer-readable storage medium of claim 21 wherein the applying of a multiple condition rule to a fact includes:
determining whether that fact satisfies a condition of that multiple condition rule;
upon determining that that fact satisfies the condition of that multiple condition rule, invoking a function to check whether that fact satisfies a next condition of that multiple condition rule, the function for,
when that multiple condition rule has no next condition, adding any inferred facts to the collection that are not already in the collection; and
returning from the function;
substituting any known variables into that next condition;
for each fact of the collection that satisfies that next condition, recursively invoking the function to check whether that fact satisfies the next condition in that multiple condition rule; and
returning the function.

26. The computer-readable storage medium of claim 21 wherein the multiple condition rules are applied in order based on the number of conditions in the rules, starting with the rules having the fewest number of conditions.

* * * * *